No. 698,538. Patented Apr. 29, 1902.
A. C. MURPHY.
CLUTCH FOR PNEUMATIC HAMMERS.
(Application filed May 17, 1901.)
(No Model.)
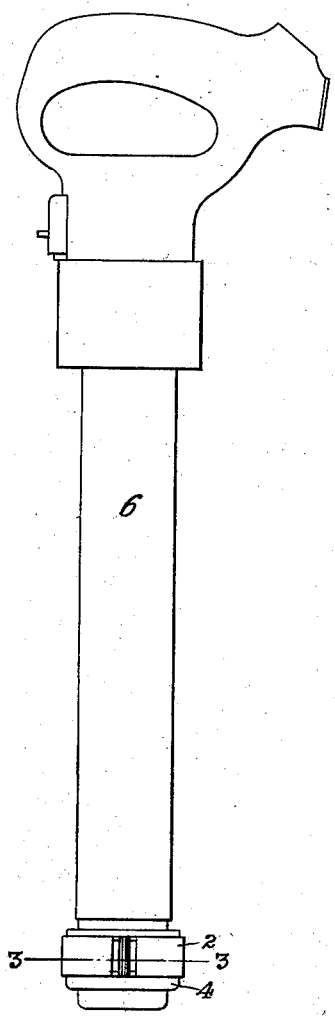
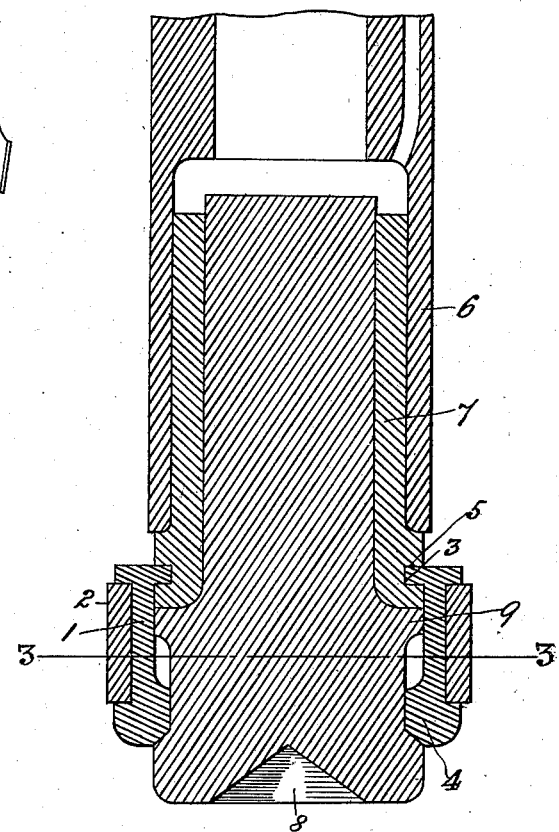
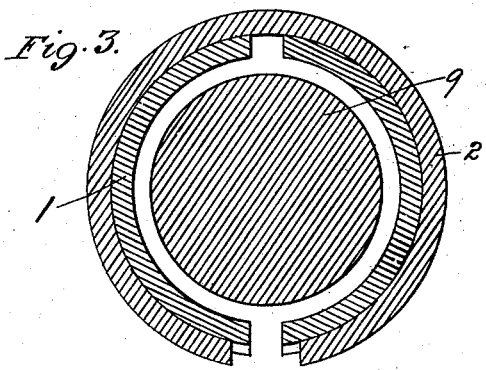
WITNESSES
Edward W Farrell
Mamie E. Mead.
INVENTOR
Albert C. Murphy,
by Carr & Carr, Attys.

UNITED STATES PATENT OFFICE.

ALBERT C. MURPHY, OF EAST ST. LOUIS, ILLINOIS, ASSIGNOR TO STANDARD RAILWAY EQUIPMENT COMPANY, A CORPORATION OF ILLINOIS.

CLUTCH FOR PNEUMATIC HAMMERS.

SPECIFICATION forming part of Letters Patent No. 698,538, dated April 29, 1902.

Application filed May 17, 1901. Serial No. 60,694. (No model.)

*To all whom it may concern:*

Be it known that I, ALBERT C. MURPHY, a citizen of the United States, and a resident of the city of East St. Louis, county of St. Clair, and State of Illinois, have invented certain new and useful Improvements in Clutches for Pneumatic Hammers, of which the following is a specification.

My invention relates to clutches for pneumatic hammers, and has for its principal object to provide a pneumatic hammer with a clutch for holding the working tool so as to permit the reciprocation thereof.

It consists principally in a pair of semicircular jaws adapted to grip the shank of the tool and a split resilient ring arranged to clamp said jaws.

It also consists in the parts and in the arrangement and combination of parts hereinafter described and claimed.

In the accompanying drawings, which form part of this specification, and wherein like symbols refer to like parts wherever they occur, Figure 1 is a view of my device applied to a pneumatic hammer. Fig. 2 is a longitudinal sectional view of my device applied to a pneumatic hammer, and Fig. 3 is a cross-sectional view thereof.

My clutch comprises two semicylindrical jaws 1. These jaws are encircled by a strong circular spring or resilient split ring 2, and in order to retain this spring in proper position it is preferable to provide a groove therefor in the outer surface of the jaws. The inner surface of the clamping-jaws is also grooved, so as to form a flange 3 along one side thereof and a shoulder 4 along the other side thereof. The flange 3 is arranged to fit in a groove 5, arranged to coöperate therewith in the circumference of the lower end of the cylinder 6, or preferably in the circumference of a nosing or sleeve 7, which is inserted in the lower end of the cylinder and projects therefrom. The shank of a button-set or other tool 8 works in this nosing or sleeve and has a rib or shoulder 9, overlapping the end of said nosing and interlocking with the shoulder of the clamping-jaws 1. The distance between the front end of the nosing and the shoulder of the clamping-jaw is greater than the width of the rib of the button-set in order that the button-set may be free to move longitudinally independently of the cylinder. The front edge of the rib of the shank and the front wall of the inner groove of the clamping-jaws and also the front inner edge of the clamping-jaws are all beveled to facilitate the insertion and removal of the button-set or other tool, such beveled edges acting after the manner of wedges to force the jaws open.

In use the clutch is mounted on the lower end of the cylinder or nosing by inserting the flanges 3 of the clamping-jaws into the grooves 5 provided therefor, in which position the clutch is held by the resilient split ring. When it is desired to insert a button-set or other tool, its shank is passed through the opening of the clutch and its rib forced against the beveled edge of the jaws. This operation wedges the jaws apart, and the rib is forced inwardly between them until it passes the shoulder at the lower end of said jaws, whereupon said jaws are forced together to interlock with said rib. In this position the tool is firmly held in proper position, while remaining free to be driven forward independently of the piston. The tool can be removed by a strong pull thereon, which causes the beveled front edge of its rib to wedge against the beveled inner edge of the shoulder of the clamping-jaws, and thereby open said jaws. The resilient split ring is mounted on the outer surface of the jaws, in which position it is amply protected by the sides of the groove, while having its end accessible for the purpose of opening the jaws.

My device is capable of use with any of the usual types of pneumatic hammers, which comprise a cylinder having ports for the admission and release of air, a piston in said cylinder, and a valve for controlling the admission and release of air. It is specially adapted, however, for use with pneumatic hammers wherein the cylinders are open at the front end and in use are closed by the shank of the working tool, as shown in the accompanying drawings.

What I claim is—

1. A clutch for pneumatic hammers comprising clamping-jaws and a resilient split ring encircling them, said jaws being adapted to be mounted upon a pneumatic hammer, substantially as described.

2. A clutch for pneumatic hammers comprising two semicircular clamping-jaws and a spring encircling them, said clutch being adapted to be mounted upon a pneumatic hammer, and shoulders on their inner faces adapted to interlock with devices provided therefor on the shank of a tool in said hammer, substantially as described.

3. The combination with a pneumatic hammer having a circumferential groove at its front end, and a tool fitting in the front end of said hammer and having a circumferential rib overlapping the end of said hammer, of a clutch comprising semicircular clamping-jaws having flanges fitting in said groove and having shoulders interlocking with said rib, substantially as described.

4. The combination with a pneumatic hammer having a circumferential groove at its front end, and a tool fitting in the front end of said hammer and having a circumferential rib overlapping the end of said hammer, of a clutch comprising semicircular clamping-jaws having flanges fitting in said groove and having shoulders interlocking with said rib, the distance between the front end of the cylinder and the shoulders of the clamping-jaws being greater than the width of the interlocking rib of the tool, whereby said tool is free to move longitudinally, substantially as described.

5. The combination with a pneumatic hammer having a circumferential groove at its front end, and a tool fitting in the front end of said hammer and having a circumferential rib overlapping the end of said hammer, of a clutch comprising semicircular clamping-jaws having flanges fitting in said groove and having shoulders interlocking with said rib, the edges of the shoulders of the clamping-jaws being beveled, substantially as described.

St. Louis, Missouri, May 15, 1901.

A. C. MURPHY.

Witnesses:
JAMES A. CARR,
MAMIE E. MEAD.